Nov. 13, 1962 R. G. FRANK 3,063,390
TABLET MACHINE WITH INSPECTION MEANS
Filed July 27, 1960 2 Sheets-Sheet 1
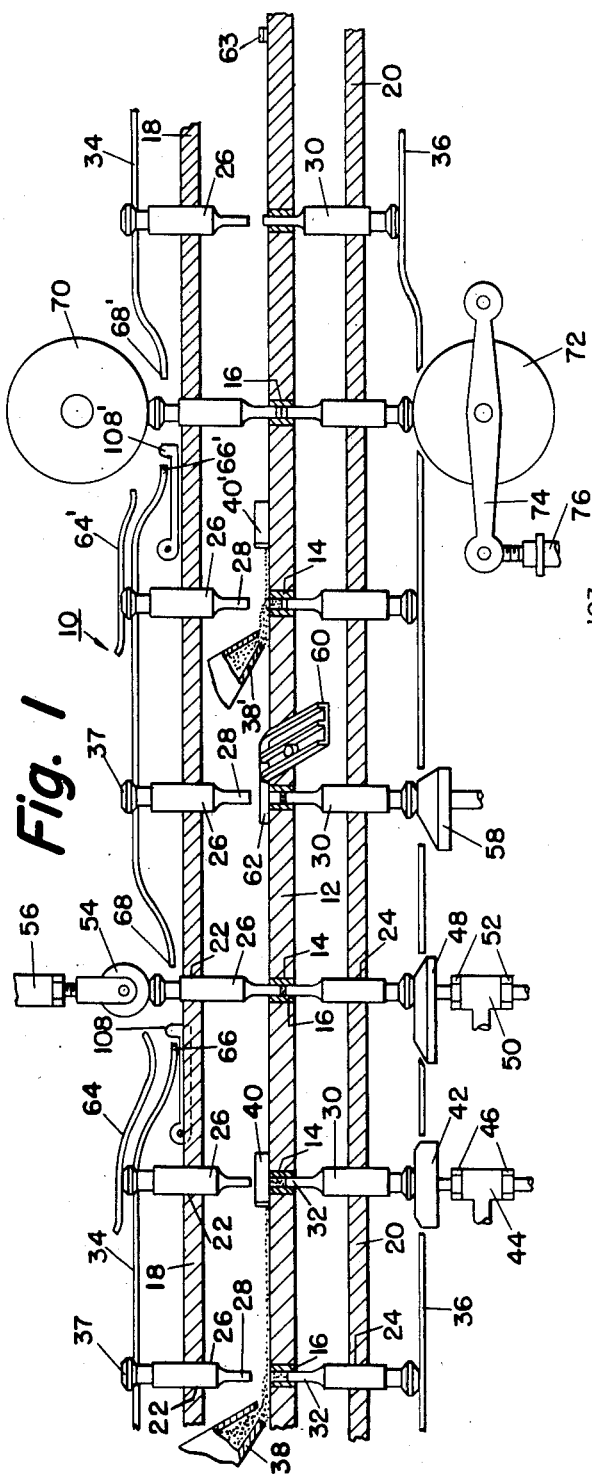
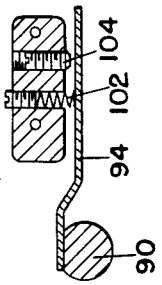
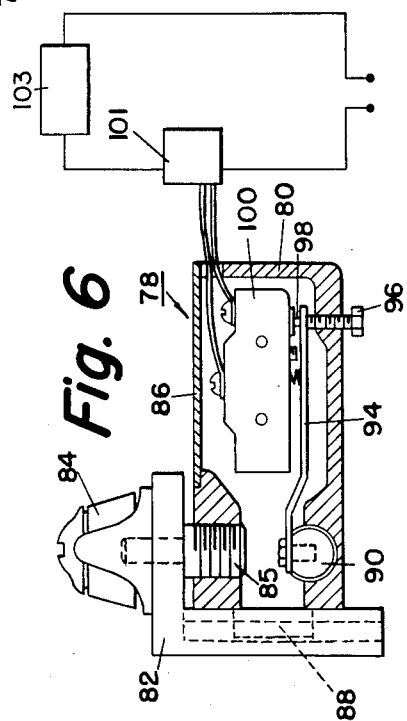
INVENTOR.
RAYMOND G. FRANK
BY Arthur H. Seidel
ATTORNEY Nov. 13, 1962 R. G. FRANK 3,063,390
TABLET MACHINE WITH INSPECTION MEANS
Filed July 27, 1960 2 Sheets-Sheet 2
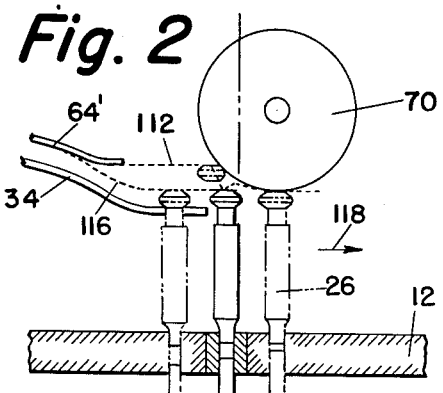
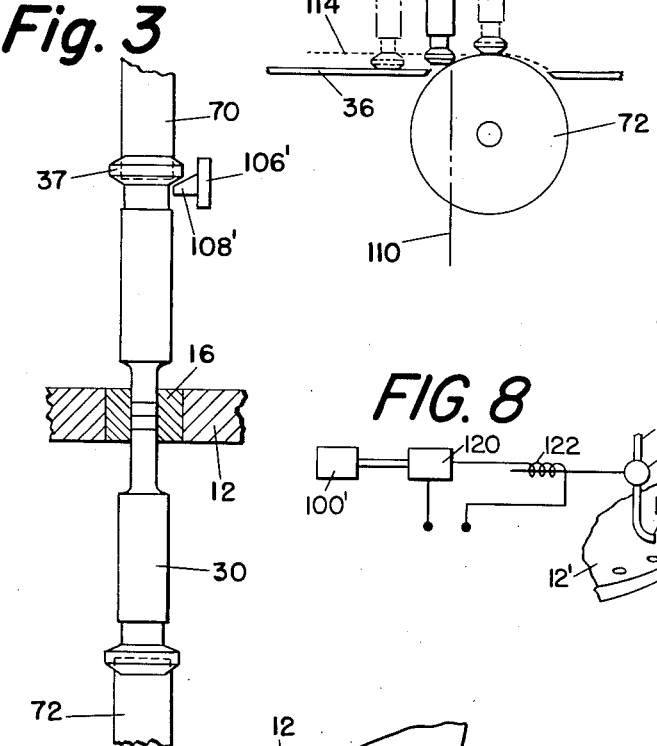
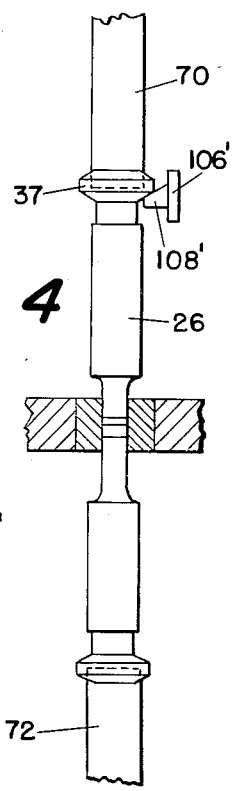
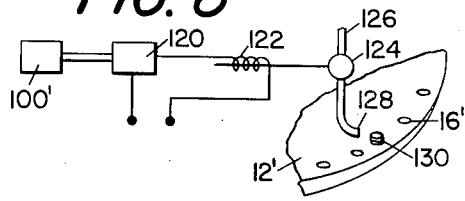
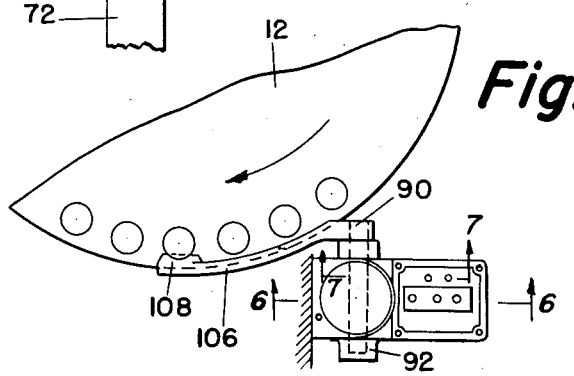
INVENTOR.
RAYMOND G. FRANK
BY Arthur H. Seidel
ATTORNEY United States Patent Office 3,063,390
Patented Nov. 13, 1962

3,063,390
TABLET MACHINE WITH INSPECTION MEANS
Raymond G. Frank, Ambler, Pa., assignor to F. J. Stokes Corporation, Philadelphia, Pa., a corporation of Pennsylvania
Filed July 27, 1960, Ser. No. 45,734
11 Claims. (Cl. 107—1)

This invention relates to a tablet machine with inspection means, and more particularly, to a tablet machine with inspection means capable of detecting the height of a column of powder prior to compression of the powder into a tablet.

The use of multi-layer tablets has become increasingly popular in the chemical and pharmaceutical industries. The advent of antibiotics has required the addition of buffers or catalysts to the multi-layer tablets so as to preclude undesirable side effects. The use of a plurality of constituents in a single tablet requires a means for detecting the amount of each constituent prior to compression of the powders into a multi-layer tablet.

In many fields of endeavor, it is desirable to utilize a tablet formed from a single constituent. It is often necessary to control the amount of powder in a tablet within a defined predetermined range. If the punches in a tablet machine are sticky, means for detecting the amount of powder in a tablet used heretofore have not been satisfactory. Thus, the detecting means used heretofore are not capable of detecting the amount of powder prior to compression of the powder into a tablet.

If any of the constituents of a multi-layer tablet are missing, or if the amount of powder in a single constituent tablet is not controlled within a defined predetermined range, an entire production lot may have to be destroyed. Thus, the lack of an adequate inspection means can be very costly to manufacturers of tablets. Also, the general public using the tablets may be endangered.

It is an object of this invention to overcome the above and other disadvantages of prior tablet making machines.

It is an object of this invention to provide a novel means for detecting the amount of powder in a tablet prior to compression of the powder into a tablet.

It is another object of this invention to provide a novel detecting means for detecting the amount of powder in each layer of a multi-layer tablet prior to compression of the individual layers of a multi-layer tablet.

It is another object of this invention to provide a novel detecting means capable of stopping a tablet making machine when a column of powder about to be compressed into a tablet is not within a predetermined range.

It is a further object of this invention to provide a novel means for detecting the amount of powder about to be compressed into a tablet by measuring the combined height of the column of powder and the upper and lower punches.

It is a further object of this invention to provide a tablet machine capable of consistently producing tablets of uniform weight by precluding the undesirable effect of sticky punches prior to compression of powder into a tablet.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a schematic view showing the programing of the upper and lower punches of the present invention.

FIGURE 2 is a schematic view of an upper and a lower punch prior to and after the plane of inspection.

FIGURE 3 is a schematic view of an upper and a lower punch wherein the proper amount of powder is present within the die.

FIGURE 4 is a schematic view of an upper and a lower punch wherein insufficient powder is present within the die.

FIGURE 5 is a partial top view of a rotary die table and the microswitch for stopping the tablet machine of the present invention.

FIGURE 6 is a cross-sectional view of the microswitch of the present invention taken along the lines 6—6 in FIGURE 5.

FIGURE 7 is a detail view of a portion of the microswitch taken along the lines 7—7 in FIGURE 5.

FIGURE 8 is a schematic illustration of the manner in which a tablet will be rejected in accordance with one embodiment of the present invention.

Referring to the drawing in detail, wherein like numerals indicate like elements, there is shown in FIGURE 1 a schematic view of the tablet machine 10 showing the programing of the upper and lower punches.

The tablet machine 10 comprises a rotary die head 12 which is rotated on a pedestal in a conventional manner. The die head 12 is provided with a plurality of die holes 14 at spaced points around the periphery of the die head 12. A die 16 is positioned within each of the holes 14. An upper punch guide 18 and a lower guide 20 are fixedly secured to the die head 12 and rotate therewith.

The upper punch guide 18 is provided with a plurality of guide passageways 22 for guiding the vertical movement of the upper punches 26. The lower punch guide 20 is provided with a plurality of guide passageways 24 for guiding the vertical movement of the lower punches 30. The upper punches 26 are provided with a die entering portion 28. The lower punches 30 are provided with a die entering portion 32. The die entering portions 28 and 32 cooperate with the die 16 to compress a column of powder into a tablet.

The upper punches 26 are guided in their movement as they move in a circumferential direction by a fixed cam track 34. The lower puunches 30 are guided in their circumferential movement by a fixed cam track 36. The head 37 on the upper punches 26 rides on the uppermost surface of the track 34. The heads of the lower punches 30 ride on the uppermost surface of the track 36.

Powder adapted to be compressed by the die entering portions 28 and 32 is fed onto the die head 12 by a hopper 38. The powder enters a die cavity defined by the die 16 and the die entering portion 32. Any excess powder is removed by a scraper blade 40 which slidably rests on the upper surface of the die head 12.

The lower punches 30 are directed in an upward direction by contact with the vertically adjustable cam 42. The cam 42 is adjustably supported on a bracket 44. Adjustment is made by digital manipulation of the adjusting nuts 46.

At the compression stage, the lower punches 30 are directed upwardly by contact with the adjustable cam 48. The cam 48 is adjustably supported on the bracket 50. Adjustment of the cam 48 is accomplished by digital manipulation of the adjusting nuts 52.

At the compression stage, the upper punches 26 are directed downwardly by contact with the roller cam 54. The roller cam 54 is adjustably mounted on the bracket 56.

After a tablet has been compressed, the tablet is selectively ejected from the die 16 by manual operation of the cam 58. The tablets are ejected from the machine by a chute 60. Proper manipulation of manually operated cam 58 will prevent the single layer tablet from being ejected from the machine so that a multi-layer tablet may be manufactured.

If it is desired to make a multi-layer tablet, the single layer tablet is permitted to remain within the die cavity. As the die cavity passes beneath the hopper 38', additional powder is discharged onto the die head 12 surrounding the die cavity. Any excess powder is removed by scraper 40'. As will be made clear hereinafter, the process is repeated so as to produce a multi-layer tablet 63.

Any malfunction in the distribution of powder onto the die head 12 by the hoppers 38 or 38' can result in an insufficient amount of powder in the die. Also, entrained air in the column of powder, or bridging of poor flowing powder in the die holes can preclude the distribution of a proper amount of powder into the die.

A vertically adjustable cam track 64 is positioned above the track 34 at a position which is prior to the stage wherein the powder within the dies 16 is compressed. The track 34 is interrupted at spaced points along the track at the compression stage of the powder within the dies 16. The ends 66 and 68 define the first interruption in the track 34. The ends 66' and 68' define the second interruption in the track 34. As seen more clearly in FIGURE 1, separate cam tracks 64 and 64' are positioned above the ends 66 and 66' respectively for a purpose to be made clear hereinafter. The cam tracks 64 and 64' are stationary with respect to the die head 12.

If it is desired to make a multi-layer tablet, the upper punch 26 is moved in a downward direction by contact with the pressure roller 70. The pressure roller 70 rotates about a fixed axis. The lower punches 30 are moved in an upward direction by contact with the pressure roller 72. The pressure roller 72 is rotatably secured to a lever arm 74. The angular position of the lever arm 74 is selectively adjusted by adjustment of the vertical support 76.

As seen more clearly in FIGURES 5 through 7, a switch 78 is provided for stopping the tablet machine 10 when the column of powder within the dies 16 is of an insufficient height. The switch 78 comprises a housing 80 which is adjustably secured to a bracket 82. The housing 80 is adjusted relative to the bracket 82 by rotation of the microdial 84. Rotation of the microdial 84 causes relative movement between the micrometer screw 85, which is fixedly secured to the microdial 84, and the housing 80. The housing 80 is provided with a dovetail 88 which cooperates with a groove of like configuration in the bracket 82. The upper surface of the housing 80 is provided with a selectively removable cover 86.

A longitudinally extending actuating shaft 90 is provided within the housing 80. The actuating shaft 90 fits in a socket in the bottom wall of the housing 80 and is journaled into bosses 92 on opposite sides of the housing 80. A switch arm 94 is fixedly secured to the actuating shaft 90. The lowermost position of the switch arm 94, as seen more clearly in FIGURE 6, is controlled by the differential adjustment screw 96. The switch arm 94 is selectively controlled so as to make or break the contact 98 of the microswitch mechanism 100.

As seen more clearly in FIGURE 7, the switch arm 94 is biased away from the contact 98 by the spring 102. The spring 102 is adjustably tensioned by a setscrew.

The uppermost position of the switch arm 94 is determined by the position of the adjustable limit stop 104. The switch arm 94 contacts the limit stop 104 after the microswitch mechanism 100 has been actuated. In the absence of the limit stop 104, the switch arm 94 could engage the contact 98 with sufficient force to injure the delicate microswitch mechanism 100. Thus, the limit stop 104 acts as a safety precaution.

An actuating lever 106 is fixedly secured to one end of the actuating shaft 90 as shown more clearly in FIGURE 5. The actuating lever 106 extends radially from the actuating shaft 90 and is provided with a tab 108 at its extremity. The tab 108 is positioned above the upper punch guide 18 between the ends 66 and 68 of the cam track 34. As seen more clearly in FIGURE 5, the actuating lever 106 is arcuate and extends along the periphery of the die head 12.

The tablet machine 10 of the present invention is used in the following manner:

The die head 12 and the upper and lower punch guides 18 and 20, respectively, rotate together so that the upper punch 26 and the lower punch 30 move from left to right when viewed in FIGURE 1. The upper punch 26 rides on the uppermost surface of the track 34. The lowermost surface fo the lower punch 30 rides on the uppermost surface of the track 36. With the die entering portion 32 of the lower punch 30 received within the die 16, powder is distributed on the die head 12 from hopper 38. The powder is dispersed on the uppermost surface of the die head 12 and enters the die cavity. As the lower punch 30 rides over the adjustable cam 42, the die 16 passes under the scraper 40 which removes any excess powder. By proper positioning of the cam 42, the height of the column desired is controlled.

As the die head 12 continues to rotate, the head 37 on the upper punch 26 rides on the uppermost surface of the cam track 34 between the cam track 34 and the adjustable cam track 64. Prior to the compression stage wherein the upper punch 26 is moved downwardly by the roller cam 54, the upper punch 26 is supported between the ends 66 and 68 by the column of powder within the die cavity. If the column within the die cavity is insufficient in height, the head 37 on the upper punch 26 will contact the tab 108 on the actuating lever 106. If the tab 108 is moved downwardly by contact with the head 37 on the upper punch 26, the actuating shaft 90 will rotate thereby causing the switch arm 94 to activate the microswitch mechanism 100. When the microswitch mechanism 100 is activated, which opens switch 101, thereby interrupting the supply of current to the motor 103 of the machine 10. Thus, the tab 108 is positioned prior to the compression of the powder within the die cavity and is responsive to the combined height of the upper punch 26, the column of powder within the die 16, and the lower punch 30.

If it is desired to make a tablet of a single constituent, the guide plate 62 is adjusted so that selected movement of the cam 58 ejects the tablet out of the die cavity onto the die head 12. As the die head 12 rotates, the tablet is caused to discharge down the fixed chute 60. Thus, there is positive assurance that the tablets discharged down the chute 60 are of consistent weight.

If it is desired to make a multi-layer tablet, the cam 58 is retained in its lowermost position so that the tablet remains within the die cavity. As the die cavity moves beneath the hopper 38', a powder of a different constituent is discharged onto the top surface of the die head 12. At this point, the upper punch 26 is riding on the uppermost surface of the cam track 34 between the cam track 34 and the adjustable cam track 64'. The powder discharged onto the die head 12 enters the die cavity on top of the first layer which has remained within the die cavity. The scraper 40' removes any excess powder from the top surface of the die head 12. Prior to being forced downwardly so as to compress the second layer of the tablet, the upper punch 26 passes between the ends 66' and 68'. If the column of powder discharged from hopper 38' is of insufficient height, the upper punch 26 will descend thereby contacting the tab 108' on the actuating lever 106'. Contact between the head 37 on the upper punch 26 and the tab 108' causes the switch 101 to stop the machine 10. If the column of powder added to the die cavity by the hopper 38' is of sufficient height, the upper punch 26 and the lower punch 30 proceed to a point where they are compressed toward one another by the pressure rollers 70 and 72. The pressure roller 70 rotates about a fixed axis whereas the position of the pressure roller 72 is selectively adjusted by digital manipulation of the vertically adjustable support 76. The pressure rollers 70 and 72 are capable of exerting the greater compressive force needed to provide the discrete layers in the multi-layer tablet 63. As the upper punch 26 and the lower punch 30 proceed beyond the pressure rollers 70 and 72, the upper punch 26 rides upwardly so that the die receiving portion 28 is removed from the cavity of the die 16. At the same time, the lower punch 30 is caused to move upwardly by the cam track 36 thereby ejecting the multi-layer tablet 63 from the cavity of the die 16. The multi-layer tablet 63 rides on the top surface of the die head 12 until it is discharged through a chute not shown.

As shown more clearly in FIGURE 2, the plane of inspection 110 precedes the center line of the pressure rollers 70 and 72. If the upper punch 26 and the lower punch 30 are sticky, they will not freely respond to gravity. If the upper punch 26 is sticky, the uppermost surface on the head 37 of the upper punch 26 will take the path shown by the dotted line 112 in FIGURE 2. The sticky upper punch 26 will ride on the lowermost surface of the cam track 64. The sticky upper punch 26 will then travel along the dotted line 112 without responding to gravity. Thus, the head 37 on the upper punch 26 will strike the pressure roller 70 to the left of the plane of inspection 110 as shown in phantom in FIGURE 2. Contact with the pressure roller 70 will cause the head 37 to descend to the position shown in full lines at the plane of inspection 110. At this point, the head on the lower punch 30 contacts the pressure roller 72 thereby causing the upper punch 26 to move upwardly into contact with the pressure roller 70 as shown by the continuation of the dotted line 112.

If the lower punch 30 is sticky, the head 37 of the lower punch 30 will follow the path of the dotted line 114. If this be the case, the head 37 of the upper punch 26 will strike the pressure roller 70 in the same manner as set forth above. However, contact between the head 37 on the upper punch 26 with the pressure roller 70 will now cause both the upper punch 26 and the lower punch 30 to move downwardly. In order to preclude damage to the punch heads, the upper punch 26 and the lower punch 30 must not be excessively sticky.

If the upper punch 26 is free, the uppermost surface on the head 37 will assume the path of the dotted line 116. The die entry portion 28 on the upper punch 26 will then descend into the die 16 to a point of maximum penetration. Therefore, the lower punch 30 will strike the pressure roller 72 thereby raising the column of powder and the upper punch 26. Before the upper punch 26 has been raised sufficiently so as to contact the pressure roller 70, the upper punch 26 and the lower punch 30 will be in the plane of inspection 110.

In each of the above situations, the presence of sufficient powder within the die 16 will prevent the head 37 on the upper punch 26 from coming in contact with the tab 108' as shown in FIGURE 3. If there is insufficient powder within the die cavity for one of the layers, the head 37 on the upper punch 26 will contact the tab 108' as shown in FIGURE 4 thereby activating the microswitch mechanism 100.

While FIGURES 2 through 4 show the plane of inspection immediately preceding the pressure rollers 70 and 72, it will be understood that a similar plane of inspection is provided immediately preceding the cams 48 and 54. Thus, the amount of powder in a single constituent tablet or a multi-layer tablet can be controlled so as to preclude the formation of a tablet if insufficient powder is present within the die cavity.

It will be noted that the detecting device of the present invention measures the combined length of the upper and lower punches 26 and 30 and the height of the column of powder between the die entering portions 28 and 32. The tab 108' is positioned at the plane of inspection 110 so that the absence of the predetermined column of powder within the die cavity causes activation of a mechanism identical with the microswitch mechanism 100. The space between the ends 66 and 66' on cam track 34 and the plane of inspection 110 allows for the repositioning of sticky or free punches.

For the sake of clarity, the actuating lever 106' and the tab 108' have not been shown in FIGURE 2. In FIGURE 2, the upper punch 26 and the lower punch 30 are moving in the direction of arrow 118. In FIGURES 3 and 4, the upper punch 26 and the lower punch 30 are shown at the plane of inspection 110. The upper punch 26 and the lower punch 30 in FIGURES 3 and 4, are viewed in the direction of arrow 118.

In place of the means set forth above wherein the machine 10 is stopped when the mechanism 100 is activated, a rejection means may be provided for rejecting a defective tablet without stopping the machine 10. Such a rejection means is schematically illustrated in FIGURE 8 and is set forth in detail in my prior Patent 2,906,214 entitled, Pill Press Apparatus. As shown in FIGURE 8, a microswitch mechanism 100', identical with microswitch mechanism 100, is electrically connected to a delay mechanism 120. The delay mechanism 120 may be a delay switch, a memory wheel as shown in my above mentioned prior patent, or other equivalent structure capable of performing a function to be explained hereinafter. It is to be noted that the delay mechanism 120 is connected to the microswitch mechanism 100' in the same manner that the switch 101 is connected to the microswitch mechanism 100.

The delay mechanism 120 is part of an electrical circuit having a coil 122 operatively controlling a valve 124. Valve 124 is positioned in a compressed air line 126.

The outlet end 128 of the air line 126 is disposed above and adjacent to the upper surface of the die head 12'. The die head 12' is identical with die head 12 and is provided with circumferentially spaced dies 16' in like manner.

The microswitch mechanism 100' is to be positioned adjacent the roller cam 50 and the pressure roller 70 in the same manner as microswitch mechanism 100. The delay time for the delay mechanism 120 is greater when it is positioned adjacent roller cam 50 than when it is positioned adjacent pressure roller 70. If an insufficient amount of powder is within the die 16', as it passes beneath the roller cam 50 or the pressure roller 70, the coil 122 will open valve 124 after a predetermined delay time. When valve 124 is open, compressed air will flow from the outlet end 128 thereby blowing the rejected tablet 130 off of the die head 12'.

A delay must be provided between the actuation of the microswitch 100' and the opening of valve 124 so as to provide sufficient time for the defective tablet to arrive opposite the outlet end 128 of the air line 126.

The present invention may be embodied in other specific forms without departing from the spirit or essential attributes thereof and, accordingly, reference should be made to the appended claims, rather than to the foregoing specification as indicating the scope of the invention.

I claim:

1. In a multi-layer tablet machine wherein various layers of a tablet are successively provided by the addition of powder to a previously formed layer, and said powder is compressed with said previously formed layer between upper and lower punches to form a multi-layer tablet, an apparatus located along the axes of said punches for checking the height of a column of powder between upper and lower punches by sensing the combined height of upper and lower punches and the column of powder prior to compression, said last mentioned means including a switch means to stop the machine in response to the absence of a predetermined height of powder prior to compression between the upper and lower punches.

2. In a multi-layer tablet machine wherein various layers of a tablet are successively provided by the addition of powder to a previously formed layer, and said powder is compressed with said previously formed layer between upper and lower punches to form a multi-layer tablet, an apparatus located along the axes of said punches for checking the height of a column of powder prior to compression by sensing the combined height of upper and lower punches and a column of powder prior to compression therebetween, and a control mechanism responsive to said last-mentioned means for rejecting a tablet formed when the column of powder prior to compression between said upper and lower punches is below a predetermined value.

3. A rotary tablet machine comprising a die head having a die cavity at circumferentially spaced points, means for rotating said die head, an upper punch disposed above and vertically aligned with one of said die cavities for vertical reciprocation into and out of said die cavity, a cam track for guiding reciprocation of said upper punch, said cam track having an interruption defined by spaced free ends, said spaced free ends enabling said upper punch to be gravity biased toward said one die cavity so that the amount of powder in said one die cavity may be sensed prior to compression of the same, means for causing said upper punch to enter said one die cavity after the amount of powder in said one die cavity has been sensed, and means for causing said upper punch to rotate with said die head.

4. A machine comprising a die head having a die cavity extending therethrough, an upper punch disposed above and vertically aligned with said die cavity for vertical reciprocation into and out of said cavity, a lower punch disposed below and vertically aligned with said cavity for vertical reciprocation into and out of said cavity, means for rotating said die head and upper and lower punches together whereby said upper and lower punches assume a plurality of positions relative to said cavity, one of said positions being a compression position wherein portions of said upper and lower punches enter said cavity thereby compressing powder in said cavity into a tablet, checking means for sensing the height of a column of said powder between said portions, a control mechanism responsive to said checking means when said combined height is below a predetermined value, said means for causing said punches to assume a plurality of positions relative to said cavity includes a cam track on which said upper punch rides, said track having spaced ends, said detecting means including a switch mechanism having a lever tab between two spaced ends of said track, said upper punch being adapted to contact said tab when the height of the column of said powder between said portions is below a predetermined height, thereby activating said switch mechanism which is capable of stopping the rotation of said die head.

5. Apparatus comprising a die head having a die cavity extending therethrough, an upper punch disposed above and vertically aligned with said die cavity for vertical reciprocation into and out of said cavity, a lower punch disposed below and vertically aligned with said cavity for vertical reciprocation into and out of said cavity, means for rotating said die head and upper and lower punches together whereby said upper and lower punches assume a plurality of positions relative to said cavity, said last-mentioned means including a cam track for guiding said punches, said cam track having interruptions therein which enable the upper punches to be gravity biased toward the lower punches, pressure rollers supported adjacent each interruption of the cam track, a microswitch supported adjacent each interruption, said microswitch having an actuating lever disposed so that it may be contacted by said upper punch prior to movement of the upper punch below its respective pressure roller only when the height of a column of powder between the punches is below a predetermined value, and said switch being capable of providing an ascertainable signal indicative of the fact that the height of the column of powder is below the predetermined value.

6. Apparatus comprising a rotary die table, means operatively associated with said table for rotating the same, a plurality of upper and lower punches supported for reciprocation toward and away from each other, said die table having a plurality of circumferentially spaced die cavities, each of said upper and lower punches having a die entering portion adapted to fit in one of said die cavities with a column of powder between said portions, cam means supported for causing said punches to move toward each other and compress powder in said one die cavity, means for checking the height of the column of powder in said one die cavity by sensing the combined height of the upper and lower punches and the column of powder between said portions before the punches are reciprocated by said cam means, and a control mechanism responsive to said checking means when said combined height is below a predetermined value, said control mechanism being adapted to effect the disposition of tablets formed when said combined height is below a predetermined value so that such tablets do not accumulate with other tablets formed when the said combined height is above the predetermined value.

7. In a tablet making machine in accordance with claim 6, wherein said checking means includes a microswitch lever positioned so that it will be tripped by an upper punch when said column of powder is below a predetermined height, and said control mechanism being operatively coupled to said microswitch.

8. A rotary tablet machine comprising a die head having a die cavity extending therethrough, an upper punch disposed above and vertically aligned with said die cavity for vertical reciprocation into and out of said cavity, a lower punch disposed below and vertically aligned with said cavity for vertical reciprocation into and out of said cavity, means for rotating said die head and upper and lower punches together whereby said upper and lower punches assume a plurality of positions relative to said cavity, one of said positions being a compression position wherein portions of said upper and lower punches enter said cavity, cam means supported adjacent said compression position for causing said punches to reciprocate toward each other and compress powder in said cavity, and a checking means for sensing the height of a column of powder in said cavity between said portions, said last-mentioned means being positioned in a plane of inspection prior to movement of said punches at said compression position, and a control mechanism responsive to said last-mentioned means for effecting the ultimate disposition of a tablet formed from a column of powder below the predetermined level.

9. A machine in accordance with claim 8 wherein said detecting means includes a microswitch mechanism, an actuating lever, a tab on said actuating lever, said actuating lever being operatively connected with said switch mechanism, said tab being positioned in said plane of inspection, whereby said upper punch contacts said tab when the height of the column of powder within said cavity is below a predetermined height, thereby activating said microswitch mechanism.

10. A machine in accordance with claim 8 wherein said cam means include pressure rollers, said pressure rollers being adapted to cause said upper and lower punches to move toward one another at said compression position, and said pressure rollers being adapted to reposition said upper and lower punches prior to said plane of inspection when one of said upper and lower punches are sticky.

11. A machine in accordance with claim 8 wherein said detecting means includes a switch mechanism, said switch mechanism including a housing, said housing being dovetailed with a bracket, a microdial on said housing for adjusting the relative position between said housing and said bracket, said housing including an actuating shaft, whereby relative movement between said housing and said bracket causes relative movement between an actuating lever on said actuating shaft and said die head.

References Cited in the file of this patent
UNITED STATES PATENTS

| | | |
|---|---|---|
| 2,470,766 | Durning | May 24, 1949 |
| 2,640,361 | Scray | June 2, 1953 |
| 2,808,058 | Halstead | Oct. 1, 1957 |
| 2,906,214 | Frank | Sept. 29, 1959 |
| 2,907,457 | Simpson et al. | Oct. 6, 1959 |
| 2,944,493 | Bailey et al. | July 12, 1960 |